(12) United States Patent
Starink et al.

(10) Patent No.: US 9,241,009 B1
(45) Date of Patent: Jan. 19, 2016

(54) MALICIOUS MESSAGE DETECTION AND PROCESSING

(71) Applicant: Proofpoint, Inc., Sunnyvale, CA (US)

(72) Inventors: Angelo Starink, Morgan Hill, CA (US); David Knight, Belmont, CA (US)

(73) Assignee: Proofpoint, Inc., Sunnyvale, CA (US)

( * ) Notice: Subject to any disclaimer, the term of this patent is extended or adjusted under 35 U.S.C. 154(b) by 0 days.

(21) Appl. No.: 14/486,990

(22) Filed: Sep. 15, 2014

Related U.S. Application Data

(63) Continuation-in-part of application No. 13/491,494, filed on Jun. 7, 2012, now Pat. No. 8,839,401.

(51) Int. Cl.
  *G06F 21/56* (2013.01)
  *H04L 29/06* (2006.01)
  *H04L 12/58* (2006.01)

(52) U.S. Cl.
  CPC .......... *H04L 63/1441* (2013.01); *H04L 12/585* (2013.01); *H04L 51/12* (2013.01); *H04L 63/1408* (2013.01); *H04L 63/1425* (2013.01); *H04L 63/1416* (2013.01)

(58) Field of Classification Search
  CPC ...................... G06F 2221/2119; H04L 12/585; H04L 51/12; H04L 63/1408; H04L 63/1425; H04L 63/1441
  See application file for complete search history.

(56) References Cited

U.S. PATENT DOCUMENTS

| | | | |
|---|---|---|---|
| 7,516,488 | B1 | 4/2009 | Kienzle et al. |
| 7,854,001 | B1 | 12/2010 | Chen et al. |
| 8,839,401 | B2 | 9/2014 | Starink et al. |
| 2006/0021031 | A1 | 1/2006 | Leahy et al. |
| 2006/0095955 | A1 | 5/2006 | Vong |
| 2006/0101120 | A1 | 5/2006 | Helsper et al. |
| 2006/0101334 | A1 | 5/2006 | Liao et al. |
| 2006/0251068 | A1 | 11/2006 | Judge et al. |
| 2007/0136806 | A1 | 6/2007 | Berman |
| 2009/0328216 | A1 | 12/2009 | Rafalovich et al. |
| 2010/0082979 | A1 | 4/2010 | Edwards |
| 2010/0154059 | A1 | 6/2010 | McNamee et al. |
| 2010/0318642 | A1 | 12/2010 | Dozier |
| 2012/0030302 | A1 | 2/2012 | Lund et al. |
| 2012/0079596 | A1 | 3/2012 | Thomas et al. |
| 2012/0102545 | A1 | 4/2012 | Carter, III et al. |
| 2012/0151585 | A1 | 6/2012 | Lamastra et al. |
| 2013/0333026 | A1 | 12/2013 | Starink et al. |
| 2014/0259158 | A1 * | 9/2014 | Brown ................. G06F 21/554 726/22 |

FOREIGN PATENT DOCUMENTS

| | | |
|---|---|---|
| EP | 2326057 | 5/2011 |
| TW | 201414260 | 4/2014 |
| WO | WO2013184529 | 12/2013 |

OTHER PUBLICATIONS

International Search Report and Written Opinion mailed Jan. 3, 2014 in Patent Cooperation Treaty Application No. PCT/US2013/043790, filed May 31, 2013.

* cited by examiner

*Primary Examiner* — Theodore Parsons
(74) *Attorney, Agent, or Firm* — Carr & Ferrell LLP

(57) ABSTRACT

Malicious message detection and processing systems and methods are provided herein. According to various embodiments, a method includes detecting, via an intermediary node, a link included in a message, the link being associated with an unknown resource, hashing a unique identifier for a recipient of the message, coupling the hashed identifier with the link, creating an updated link and updated message, and forwarding the updated message to the recipient.

20 Claims, 16 Drawing Sheets

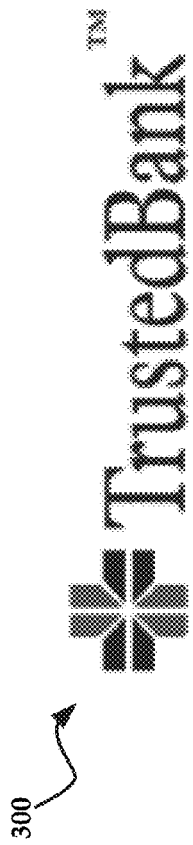

Dear valued customer of TrustedBank,

We have recieved notice that you have recently attempted to withdraw the following amount from your checking account while in another country: $135.25.

If this information is not correct, someone unknown may have access to your account. As a safety measure, please visit our website via the link below to verify your personal information:

http://www.yourtrustedbank.com/general/custverifyinfo.asp ← 305

Once you have done this, our fraud department will work to resolve this discrepency. We are happy you have chosen us to do business with.

Thank you,
TrustedBank

FIG. 3

| Enabled | Classification | Description | Condition | Action | Order | | |
|---|---|---|---|---|---|---|---|
| ☐ | spam_definite | Definite Spam | Spam score greater than or equal to 100 | • Add header X-Proofpoint-Spam-Details=$SpamDetails.<br>• Discard the message. | ▷ | Edit | Delete |
| ☑ | phish | Phish Spam | Phish spam score greater than or equal to 80 AND Spam score greater than or equal to 50 | • Add header X-Proofpoint-Spam-Details=$SpamDetails.<br>• Send to quarantine folder [Phish].<br>• Discard the message. | ◁ ▷ | Edit | Delete |
| ☑ | adult | Adult Spam | Adult spam score greater than or equal to 80 AND Spam score greater than or equal to 50 | • Add header X-Proofpoint-Spam-Details=$SpamDetails.<br>• Send to quarantine folder [Adult].<br>• Discard the message. | ◁ ▷ | Edit | Delete |
| ☑ | spam | Spam | Spam score greater than or equal to 50 | • Add header X-Proofpoint-Spam-Details=$SpamDetails.<br>• Send to quarantine.<br>• Discard the message. | ◁ ▷ | Edit | Delete |
| ☑ | bulk | Bulk Email | Bulk email score greater than or equal to 80 | • Add header X-Proofpoint-Spam-Details=$SpamDetails.<br>• Send to quarantine folder [Bulk].<br>• Discard the message. | ◁ ▷ | Edit | Delete |
| ☐ | suspect | Delay Suspected Messages | Suspected spam score greater than or equal to 80 | • Add header X-Proofpoint-Spam-Details=$SpamDetails.<br>• Send to quarantine folder [Suspected Spam]. | ◁ | Edit | Delete |
| ☑ | notspam | Not Spam | Spam score greater than or equal to 0 | • Add header X-Proofpoint-Spam-Details=$SpamDetails. | | Edit | |

FIG. 5

MALICIOUS MESSAGE DETECTION AND PROCESSING

CROSS REFERENCE TO RELATED APPLICATIONS

This application is a continuation-in-part of prior U.S. application Ser. No. 13/491,494, filed Jun. 7, 2012 (now U.S. Pat. No. 8,839,401), which is hereby incorporated by reference herein in its entirety, including all reference cited therein.

FIELD OF THE PRESENT TECHNOLOGY

The present technology relates generally to detecting and processing malicious messages, and more specifically, but not by way of limitation, to systems and methods for detecting and processing malicious and potentially malicious email messages, which protect email message recipients from exposure to spam, phishing, bulk, adult, and other similar types of deleterious and undesirable email messages and exposure to malicious and potentially malicious resources included in such emails.

BACKGROUND

Malicious electronic messages may include, for example, spam, phishing, bulk, adult, and other similar content, which are designed to generate revenue. The messages may be in the form of email, instant messages, and the like. Although the description herein includes examples and other description of messages in the email context, the present invention is not limited to email messages. In addition, some types of malicious emails are designed to steal sensitive information such as bank account information, credit card account information, usernames and passwords, and social security numbers—just to name a few. Some malicious emails such as phishing emails will appear to be generated by a legitimate source, such as a merchant with which the end user conducts business. These emails may include logos, trademarks, and/or other source indicators that are used to make the email appear to be legitimate. These types of emails are often referred to as spoofed email or cloned emails. Some types of spoofed/cloned emails may be specifically targeted to certain individuals and are often referred to as spear phishing attacks.

With regard to spoofed emails, these malicious emails will also include a hyperlink that appears to be associated with a legitimate website operated by the merchant. Unfortunately, these hyperlinks are linked to malicious resources that are designed to steal sensitive information from end users. For example, the malicious resource may include a fake login page that spoofs the login page of an online banking interface. When the end user enters their logon information, the logon information is exposed and captured.

SUMMARY

According to some embodiments, the present technology may be directed to methods for processing messages using an intermediary node. An example method comprises: (a) detecting, via the intermediary node, a link included in a message, the link being associated with an unknown resource; (b) hashing a unique identifier for a recipient of the message; (c) coupling the hashed identifier with the link, creating an updated link and updated message; and (d) forwarding the updated message to the recipient.

According to other embodiments, the present technology may be directed to methods for processing messages using an intermediary node. An example method comprises: (a) receiving a message that includes a link to an unknown resource; (b) placing the unknown resource in a sandbox for a testing period of time so as to determine if the unknown resource is malicious; (c) for each message of a plurality of subsequent messages for a plurality of different recipients, the plurality of subsequent messages comprising the link, the plurality of messages being received during the testing period of time; (d) for each message of a plurality of subsequent messages for a plurality of different recipients, the plurality of subsequent messages comprising the link, the plurality of messages being received during the testing period of time: (i) hashing a unique identifier for a recipient of a message; (ii) coupling the hashed identifier with to create an updated link; and (iii) transmitting to the recipient a message with the updated link.

According to additional embodiments, the present technology may be directed to an intermediary node system. An example intermediary node system comprises: (a) a processor; and (b) a memory for storing executable instructions, the executable instructions comprising: (1) an analysis module that detects a link included in messages sent to a plurality of recipients, the link being associated with an unknown resource; (2) a modifier module that, for the plurality of recipients: (i) couples a hashed value with the link, the hashed value being a hashing of a unique identifier for a recipient of the message in combination with a validation hash for detection of manipulation of the hashed value; (ii) creates an updated link and updated message; and (iii) forwards the updated message to the recipient.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

FIG. 3 is an exemplary malicious email in the form of a spoofed email.

FIG. 5 is a table of exemplary spam rules that are utilized to categorize emails.

DETAILED DESCRIPTION OF EXEMPLARY EMBODIMENTS

Figure 1:
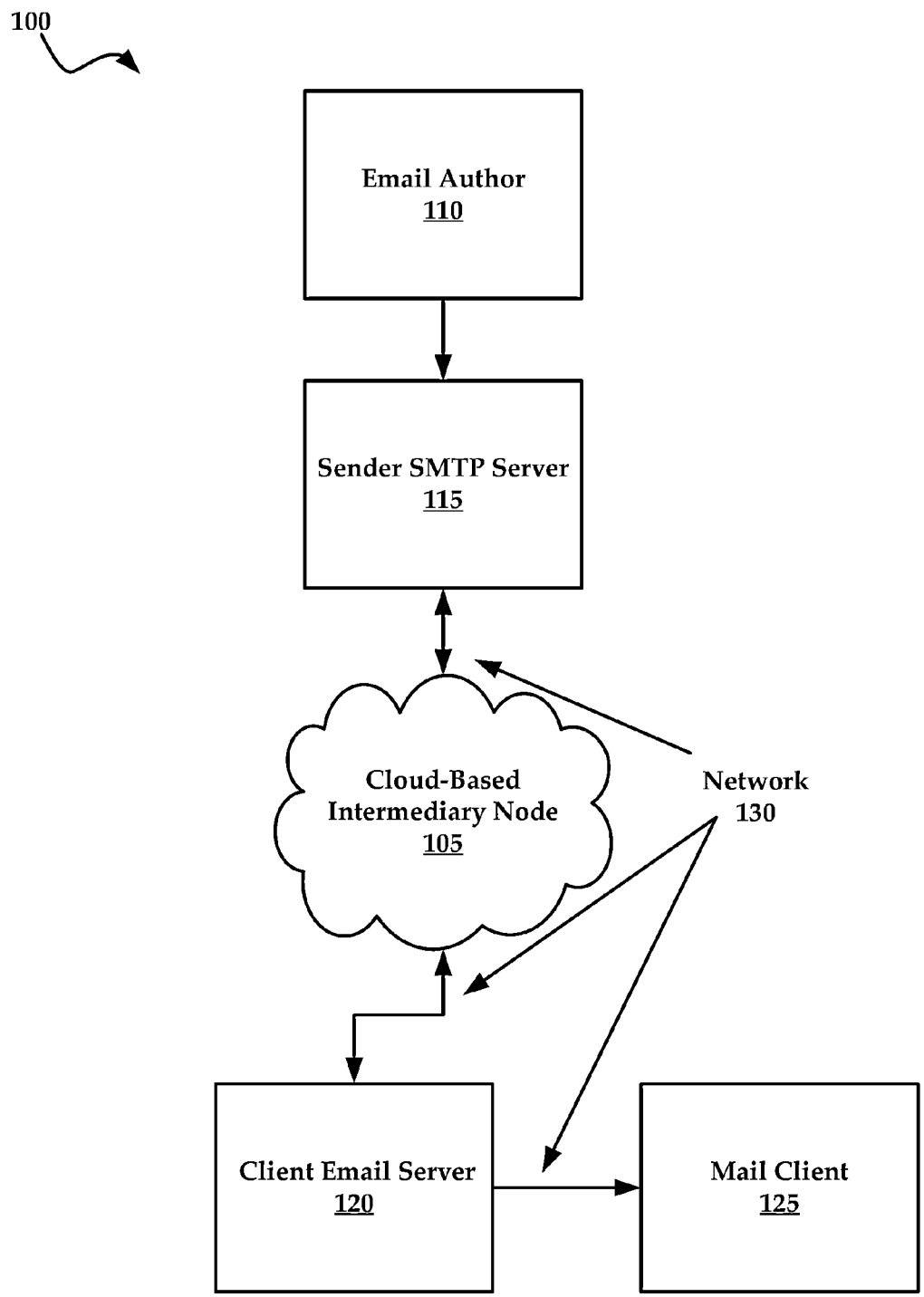
FIG. 1 illustrates an exemplary architecture for practicing aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology may be directed to malicious message detection and processing. The messages may be in the form of email, instant messages, and the like. Although the description herein includes examples and other description of messages in the email context, the present invention is not limited to email messages. More specifically, but not by way of limitation, the present technology may employ a cloud-based intermediary node that is configured to detect potentially malicious emails and confirm whether the email comprises malicious content. As background, a malicious email may include spam, adult, phishing, bulk, and/or other similar types of content. These emails serve to generate revenue for their respective authors, but are often an annoyance to the recipient, and may often be sent with nefarious intent. As mentioned above, some malicious emails may include links that are designed to deceive the recipient into disclosing sensitive information such as social security numbers, credit card numbers, and so forth.

The present technology may detect whether an email communication is likely malicious. Additionally, if the email is likely to be malicious, the present technology may parse the email to determine if there are links included in the email that are associated with malicious resources. A malicious resource may include a spoofed website that is designed to induce the recipient into exposing their sensitive information, although other common malicious resources that would be known to one of ordinary skill in the art may likewise be detected by the present technology.

Once the present technology has determined that an email includes a link to a potentially malicious resource, the present technology may exchange the link with an alternate link to a safe resource, such as a block webpage. The present technology may also modify the email to include a visual representation of the actual domain name of the potentially malicious resource so that the recipient may see the true identity of the link. This feature may be advantageous in instances where the viewable text of the hyperlink is ambiguous and/or misleading. In some instances, access to the potentially malicious resource may be prohibited by deactivating or breaking the hyperlink such that the recipient cannot request or receive the resource by clicking on the hyperlink text. Hyperlinks embedded within images or other resources may also be processed in a similar manner. The present technology may also determine that the link in an email is safe, i.e., certainly not malicious. For example, a link may be known to be safe since it is on a safelist or otherwise known to be safe.

The present technology may also score email messages to determine a likelihood that the email is malicious, as well as quarantining malicious emails, and generating blocklists of malicious resources, and safelists. These and other advantages of the present technology will be described in greater detail below with reference to the collective drawings (e.g., FIGS. 1-12).

FIG. 1 illustrates an exemplary architecture 100 for practicing aspects of the present technology. According to some embodiments, the exemplary architecture 100, hereinafter "architecture 100," may generally include a cloud-based intermediary node, hereinafter "intermediary node 105." Generally speaking, the intermediary node 105 may be configured to process emails by analyzing a link included in an email to determine if the link is associated with a potentially malicious resource and replacing the link with an alternate link to a trusted resource if the link is associated with a potentially malicious resource. In various embodiments, if the link is identified as being certainly malicious, the email is filtered and not delivered to the email server.

In various embodiments, the intermediary node 105 may be configured to locate at least one uniform resource locator included in an email, analyzing the at least one uniform resource locator to determine if the at least one uniform resource locator is associated with a potentially malicious resource, and replace the at least one uniform resource locator with an alternate link to a trusted resource if the at least one uniform resource locator is associated with a potentially malicious resource.

According to some embodiments, the intermediary node 105 may be implemented within a cloud-based computing environment, i.e., cloud-based intermediary node 105. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users). Typically, each user places workload demands upon the cloud that vary in real-time, sometimes dramatically. The nature and extent of these variations typically depend on the type of business associated with the user.

Email authors 110 may compose emails that are delivered to a recipient by a sender server 115, which may include a server that implements simple mail transfer protocol ("SMTP"). Email authors 110 may compose both legitimate and/or malicious emails using an email program, which may include, for example, Outlook™, Entourage™, and so forth. The email author 110 may also compose and send emails using a web-based email interface. In a traditional configuration, the sender SMTP server 115 may deliver email messages directly to a client email server 120, which would deliver the email to a mail client 125, such as an email program or web-based email interface. The client email server 120 may comprise, for example, an enterprise email server such as Exchange™, Domino™, and so forth.

In accordance with the present technology the intermediary node 105 may be positioned between the sender SMTP server 115 and the client email server 120. Thus, the intermediary node 105 may filter and/or process potentially/actually malicious emails before the emails are delivered to the client email server 120.

The components included in the architecture 100 may be communicatively coupled via a network 130. It is noteworthy to mention that the network 130 may include any one (or combination) of private or public communications networks such as the Internet.

Figure 2:
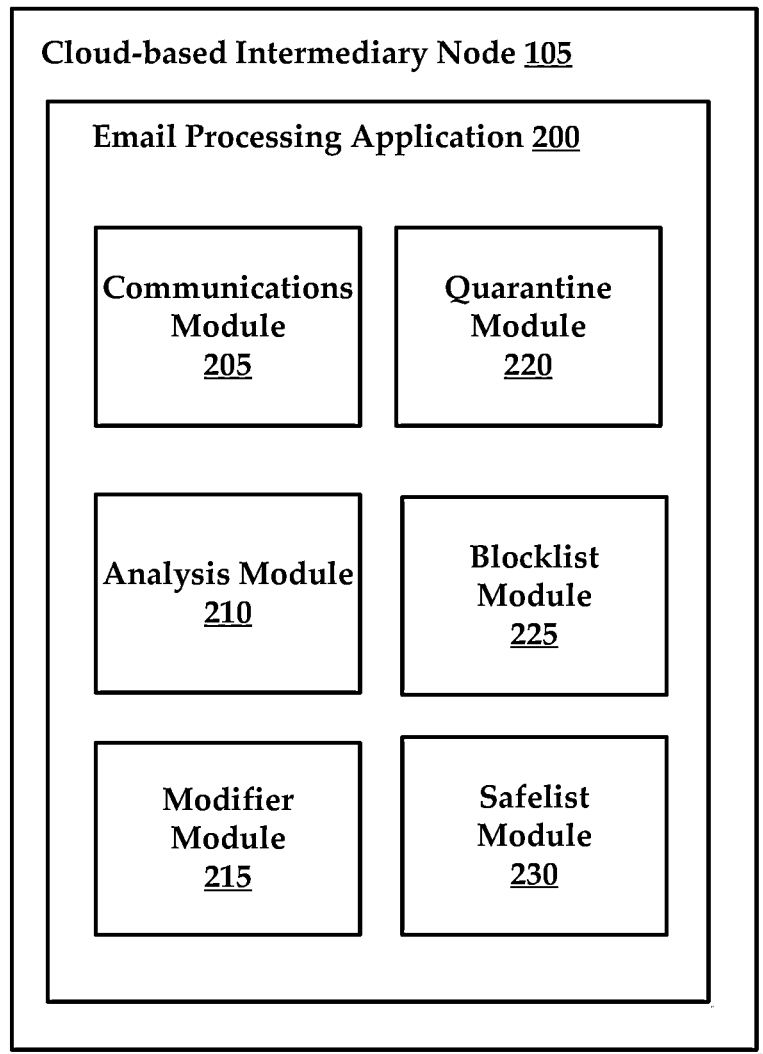
FIG. 2 is a block diagram of an exemplary email processing application for use in accordance with the present technology.

Referring now to FIG. 2, the Cloud-based intermediary node 105 may include executable instructions that are stored in memory. These instructions may be executed by a processor of the intermediary node 105. An exemplary computing system that includes memory and a processor is described in greater detail with reference to FIG. 12. FIG. 2 includes a block diagram of an email processing application 200. According to some embodiments, when executed, the email processing application 200 may cause the intermediary node 105 to perform various methods for processing emails, which will be described in greater detail below.

According to some embodiments, the email processing application 200 may comprise a communications module 205, an analysis module 210, a modifier module 215, a quarantine module 220, and a blocklist module 225, and safelist module 230. It is noteworthy that the email processing application 200 may include additional modules, engines, or components, and still fall within the scope of the present technology. As used herein, the term "module" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual modules of the email processing application 200 may include separately configured web servers.

Generally speaking, the communications module 205 may receive email messages, both malicious and non-malicious, from various sender SMTP server systems, as shown in FIG. 1. FIG. 3 illustrates an exemplary malicious email 300 that spoofs the layout and content of an exemplary email sent by a trusted organization, such as a bank. This email 300 includes an exemplary link 305, such as a hyperlink. While the link appears to be associated with the domain name of the trusted organization, an examination of the source code of the email reveals that the link 305 is actually associated with a potentially malicious resource. For example, the source code for the link 305 may specify "<A HREF="http://www.spammer.domain">http://www.yourtrustedbank.com/general/custverifyinfo.asp</A>," where http://www.spammer.domain includes a potentially malicious resource.

Once an email is received, the analysis module 210 may be executed to evaluate the email and determine if a link included in the email is associated with a potentially malicious resource. It will be understood that the emails may be pre-processed by a general purpose spam filter to remove emails that are easily identifiable as being certainly, not just potentially, malicious, just by a review of content included in the email. For example, an email that includes textual content that references adult material may be automatically classified as spam and deleted or quarantined.

In addition, the pre-processing of emails may include the generation of a trust/reputation/spam score for the email.

Figure 4:
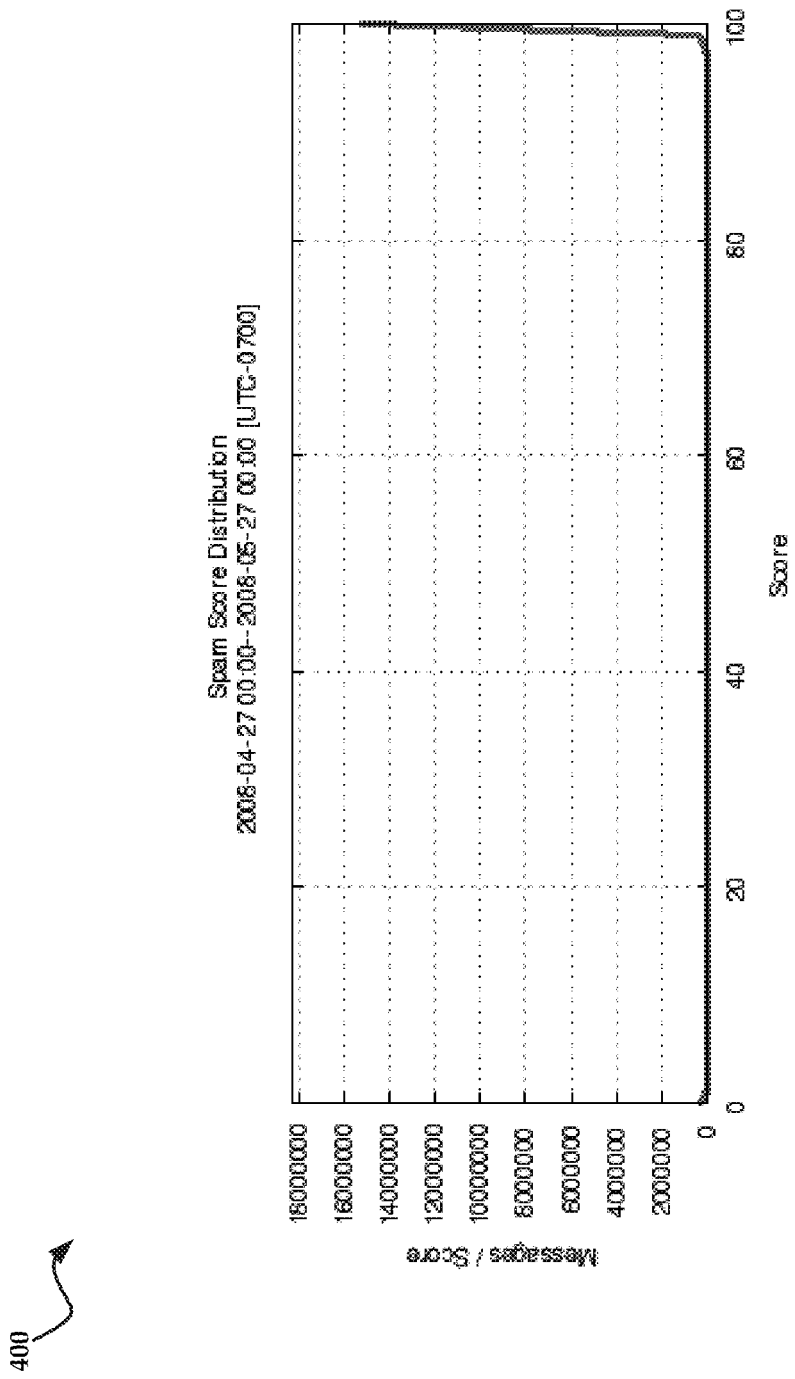
FIG. 4 is a graph of an exemplary distribution of spam scores generated for a plurality of email messages.

FIG. 4 illustrates a chart 400 which comprises an exemplary distribution of spam scores for a plurality of emails. As is shown, the vast majority of emails are, in fact, malicious. What is also apparent is that not all emails receive a score of zero (which indicates that the email is definitely not malicious), or one hundred (which indicates that the email is almost certain to be malicious). The present technology may aid in the processing of emails that receive a score somewhere between zero and one hundred (i.e., potentially malicious emails), although in some instances it may be advantageous to process all emails using the present technology. For example, email administrator may desire to identify and categorize as many malicious resources as possible to create a robust blocklist and a safelist, as will be described in greater detail below. In some embodiments, delivery of an email is temporarily delayed by the intermediary node 105, e.g., thirty minutes, in order to determine the disposition of an email message based on new information which might have been received during the delay period. After the delay period, the score of the message might be different and therefore, the associated action taken for the email may also be different.

FIG. 5 illustrates an exemplary table 500 that comprises various attributes of spam rules that are applied to emails by the pre-processing system mentioned above. As is shown, emails may be classified as definite spam (emails with a spam score of 100), phishing, adult, spam, bulk, suspect, and not spam. Again, the present technology may assist in further processing emails that have been categorized as "suspect", i.e., potentially malicious.

Once emails have been received by the communications module 205, the analysis module 210 may be executed to evaluate links associated with the emails. Again, a link may comprise any of a uniform resource locator ("URL"), a uniform resource indicator ("URI"), an Internet protocol address ("IP"), a domain name, or combinations thereof. The link may comprise any hyperlink that is associated with online resource. These resources may be linked to any of text, an image, a video, an icon, or any other object that can be included in an email message that would be known to one of ordinary skill in the art with the present disclosure before them. For example, a hyperlink often includes a text string (e.g., "Click Here") that instructs or entices the recipient into clicking on the hyperlink.

The analysis module 210 may conduct an initial evaluation of any of the links associated with an email. The analysis module 210 may employ any one (or combination) of a number of techniques for preliminarily evaluating a link. For example, the analysis module 210 may evaluate an age of a domain name associated with an online resource. The analysis module 210 may automatically classify links associated with domains that were registered within a specific time period as potentially malicious. By way of non-limiting example, links to domains that were registered within the last three days may be classified as potentially malicious.

Once a link has been found to be associated with a potentially malicious resource, the modifier module 215 may be executed to replace the link associated with potentially malicious resource with an alternate link. In some instances, the link may be replaced with an alternate link that is associated with a trusted resource such as a landing page. In some instances, the landing page may comprise a block webpage (see FIG. 7). In various embodiments, the alternate link may include a redirection script that directs the recipient to a well-known search page or other resource.

For example, the modifier module 215 may modify the source code of the email to replace the link associated with the potentially malicious resource. In some instances, the modifier module 215 may display an indicator associated with the potentially malicious resource proximate the link. Thus, the domain name associated with the potentially malicious resource may be exposed to the email recipient. In some instances, the modifier module 215 may deactivate the link. That is, the modifier module 215 may modify the link in the email to prevent the email recipient from opening the potentially malicious resource. Thus, if the email recipient clicks on the link, no action is performed (i.e., the potentially malicious resource is not returned).

In some embodiments, emails may be quarantined by the quarantine module 220 when the email has been categorized as potentially malicious or alternatively after the link associated with email has been verified as malicious.

According to some embodiments, emails that have been categorized as potentially malicious and quarantined may be re-evaluated by the analysis module 210 while quarantined. For example, if an email includes a link that is associated with a domain that has only recently been registered, subsequent evaluation of the link after a given period of time may reveal that the domain name is associated with a legitimate resource. Thus, while the link was initially categorized as potentially malicious, the link was actually non-malicious. The email may be redelivered to the client email server 120 and finally to the mail client 125.

In other embodiments, the email may not be quarantined, but the link may be provisionally deactivated. When subsequent analysis reveals that the link is associated with a legitimate resource, the link in the email may be reactivated and the email pushed/delivered to the mail client 125. The analysis module 210 may include comparing information regarding the potentially malicious resource to safelists, which may be private or publically available safelists. These safelists may comprise IP addresses, domain names, MAC addresses, or other computing system indicators that may be used to identify an online resource.

The analysis module 210 may also verify that a potentially malicious resource is, in fact, malicious. The analysis module 210 may include comparing information regarding the malicious resource to blocklists, which may be private or publically available blocklists. These blocklists may comprise IP addresses, domain names, MAC addresses, or other computing system indicators that may be used to identify an online resource. In various embodiments, the analysis module 210 may also conduct a deep-content inspection of the potentially malicious resource by loading the potentially malicious resource in a sandbox (e.g., testing) environment on the intermediary node 105.

Other methods for verifying the malicious nature of an online resource that would be known to one of ordinary skill in the art are also likewise contemplated for use in accordance with the present technology.

According to some embodiments, once a link has been confirmed to be associated with a malicious resource, the blocklist module 225 may be executed to store identifying information for that resource in a blacklist for future reference. Conversely, according to some embodiments, once a link has been confirmed to be associated with a safe resource that is certainly not malicious, the safelist module 230 may be executed to store identifying information for that resource in a safelist for future reference.

Figure 6:
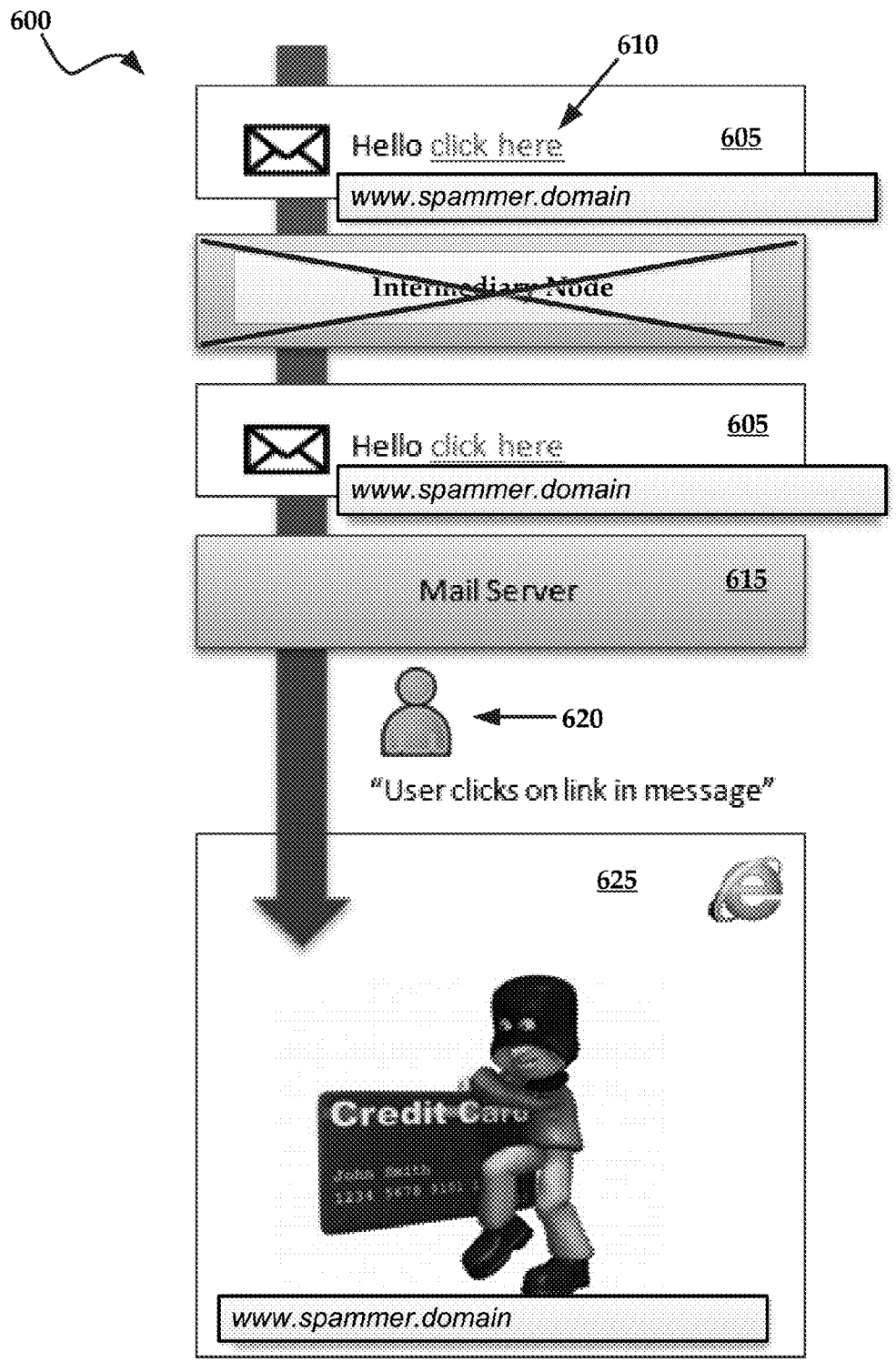
FIG. 6 is an exemplary flow diagram of a typical phishing attack.

FIG. 6 is a diagrammatical representation of a phishing attack 600 where a potentially malicious email is not intercepted or quarantined. Generally, a potentially malicious email 605 is received. The potentially malicious email 605 may comprise a link 610 to a potentially malicious resource. Because the potentially malicious email 605 is not processed by an intermediary node of the present technology, the email is received by the mail server 615 and passed through to a mail client 620. When the email recipient clicks on the link 610, a potentially malicious resource 625 is returned to the recipient. In this instance, the potentially malicious resource 625 may include a webpage that is designed to steal sensitive information from the recipient.

Figure 7:
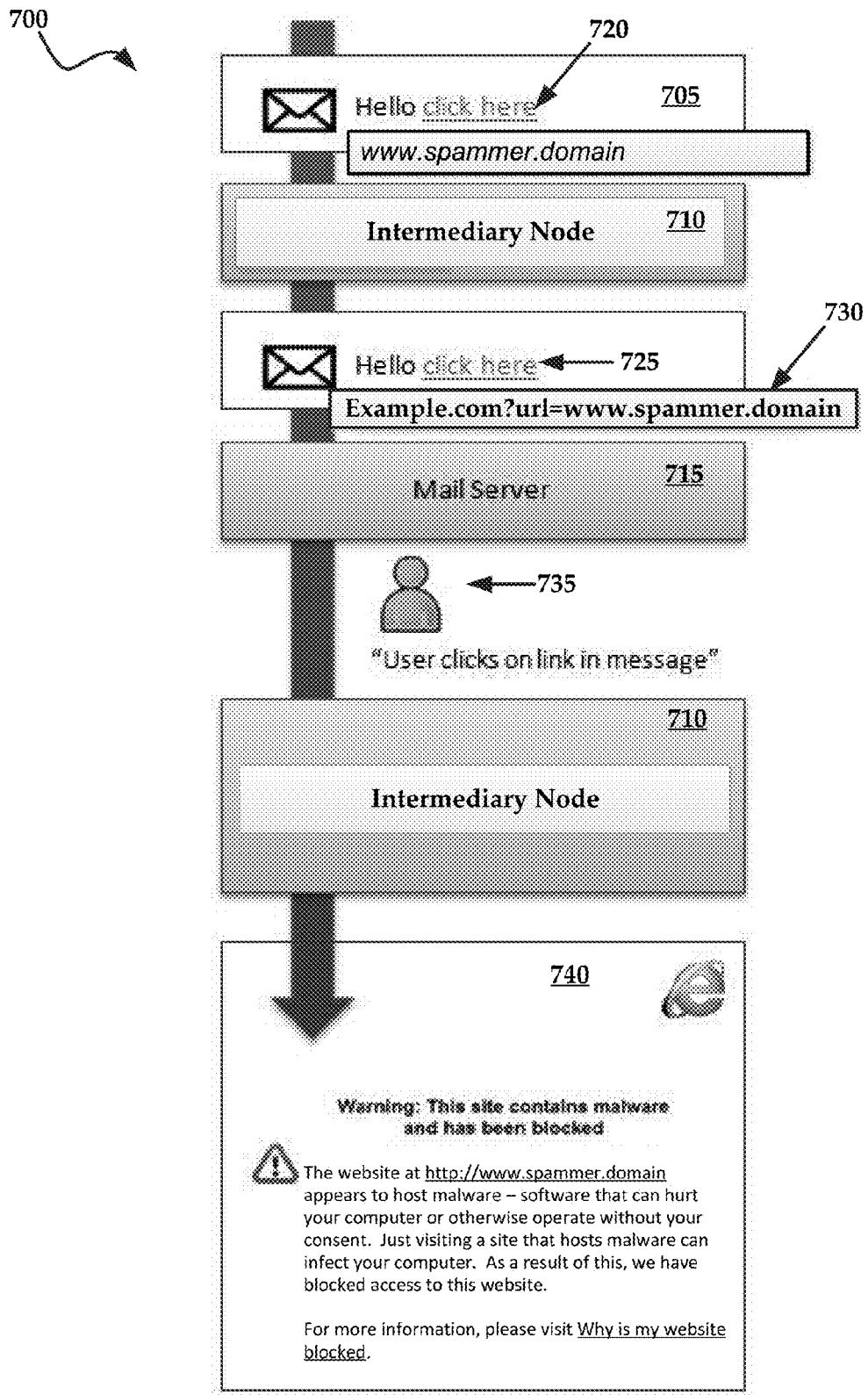
FIG. 7 is a diagrammatical representation of a phishing attack where a malicious email is detected and processed by the present technology.

FIG. 7 is a diagrammatical representation of a phishing attack 700 where a potentially malicious email is intercepted by the present technology. Generally, a potentially malicious email 705 is received by an intermediary node 710 prior to delivery to the mail server 715. The potentially malicious email 705 may comprise a link 720 to a potentially malicious resource. The intermediary node 710 may replace the link 720 with an alternate link 725. Additionally, the intermediary node 710 may modify the email to include an indicator 730 that includes at least a portion of the domain associated with the potentially malicious resource (e.g., url=www.spammer.domain). In some instances, the indicator 730 may be displayed in parentheses, or in any other manner that causes the domain of the potentially malicious resource to be set apart or distinctive, and thus more visually distinct to the email recipient. The indicator may be configured for other indications depending on the various applications and user needs.

Figure 8A:
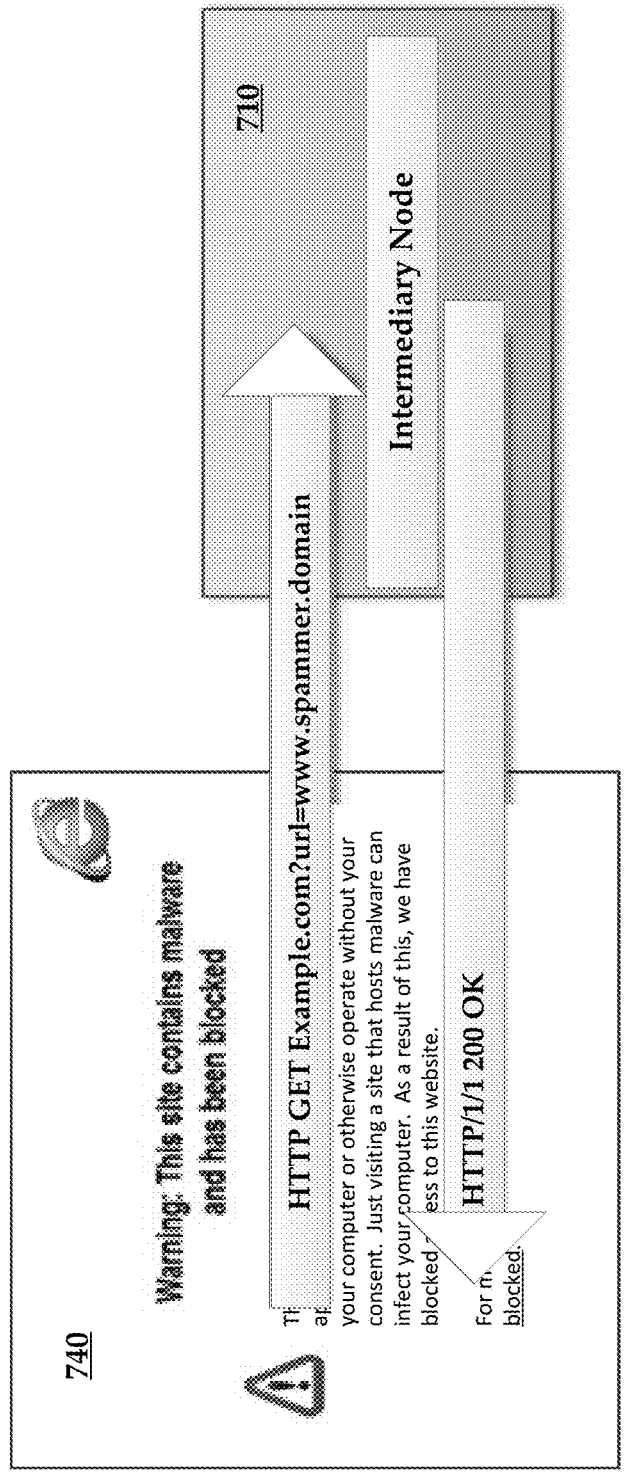
FIG. 8A is a diagrammatical representation of the provision of a landing page.
Figure 8B:
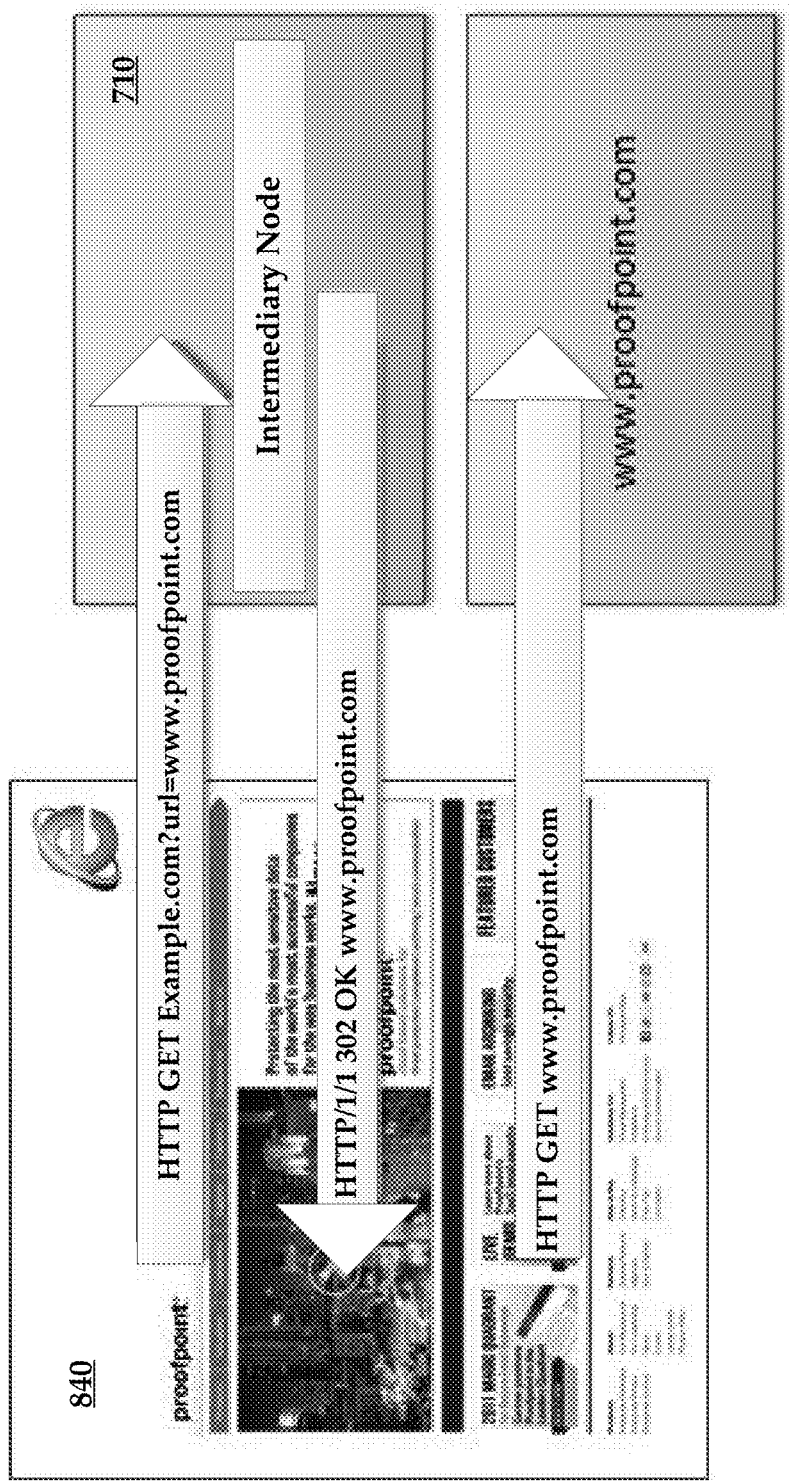
FIG. 8B is a diagrammatical representation of the provision of redirecting to an original link that is determined to be a valid, i.e., not potentially malicious, link.

When the email recipient 735 clicks on the alternate link 725, the intermediary node 710 provides the email recipient with a landing page 740, which in this embodiment comprises a block page that notifies the email recipient that the original link was associated with a potentially malicious resource. FIG. 8A illustrates the intermediary node 710 requesting a potentially malicious resource and returning a landing page 740. FIG. 8B illustrates an exemplary embodiment wherein the intermediary node 710 returns a HTTP 302 redirect to the original link that was determined by the intermediary node 710 to be a valid, i.e., not potentially malicious, link. As shown in this example, it is totally transparent to the end user that clicking the link resulted in contacting the intermediary node 710 first before opening the actual webpage 840 at the link.

Figure 9:
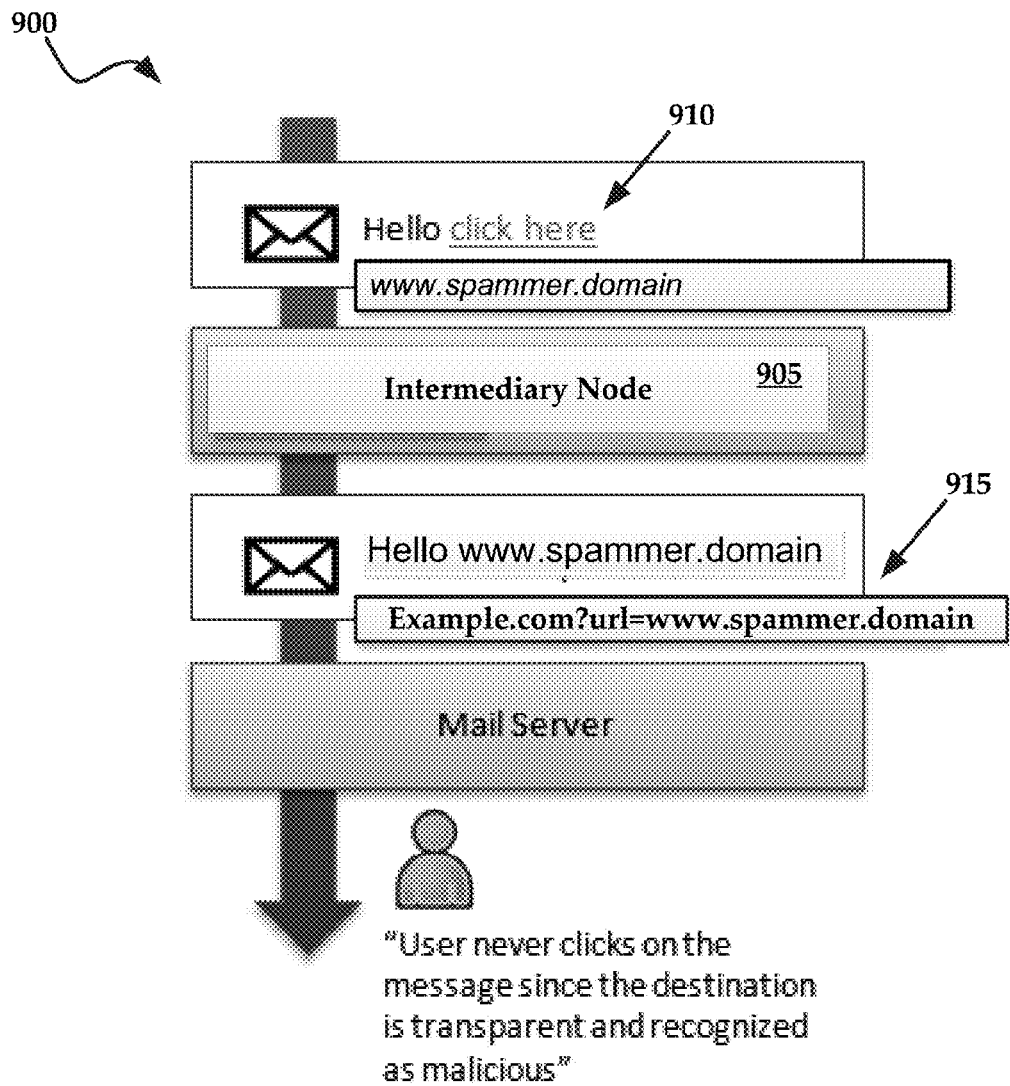
FIG. 9 is another diagrammatical representation of a phishing attack where a malicious email is detected and processed by the present technology.

FIG. 9 is a diagrammatical representation of a phishing attack 900 where a potentially malicious email is intercepted by the present technology. In this instance an intermediary node 905 may rewrite a link 910 associated with a potentially malicious resource in order to show transparency, e.g., the actual link ("www.spammer.domain"); so the end user can make a better and more informed decision whether to click on this link or not. In some embodiments, the intermediary node 905 may also display an indicator 915 for the link 910.

Figure 10:
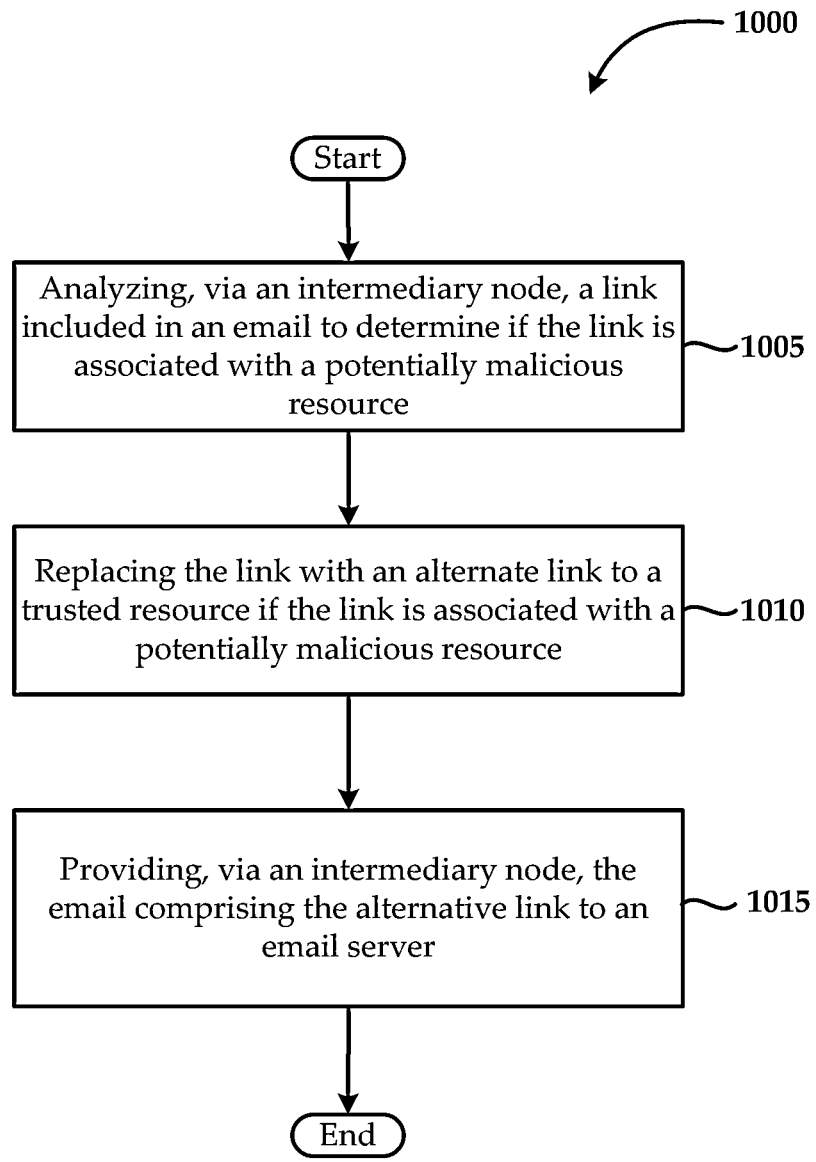
FIG. 10 is a flowchart of an exemplary method for processing emails in accordance with the present disclosure.

FIG. 10 is a flowchart of an exemplary method for processing emails. The method 1000 may comprise a step 1005 of analyzing, via the intermediary node, a link included in an email to determine if the link is associated with a potentially malicious resource. The method may also comprise a step 1010 of replacing the link with an alternate link to a trusted resource if the link is associated with a potentially malicious resource, as well as a step 1015 of providing, via an intermediary node, the email comprising the alternative link to an email server.

Figure 11:
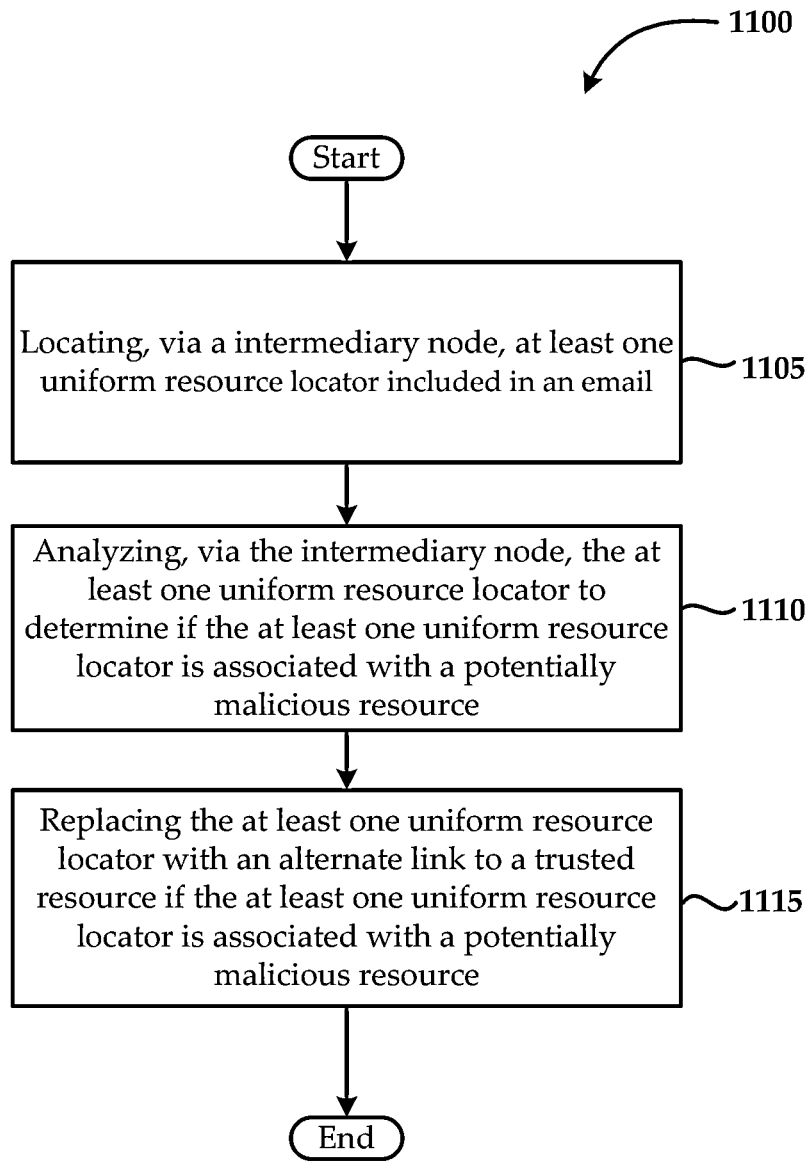
FIG. 11 is a flowchart of another exemplary method for processing emails in accordance with the present disclosure.

FIG. 11 is a flowchart of another exemplary method for processing emails. The method 1100 may comprise a step 1105 of locating, via the intermediary node, at least one uniform resource locator included in an email. The method may also comprise a step 1110 of analyzing, via the intermediary node, the at least one uniform resource locator to determine if the at least one uniform resource locator is associated with a potentially malicious resource, as well as a step 1115 of replacing the at least one uniform resource locator with an alternate link to a trusted resource if the at least one uniform resource locator is associated with a potentially malicious resource.

Figure 12:
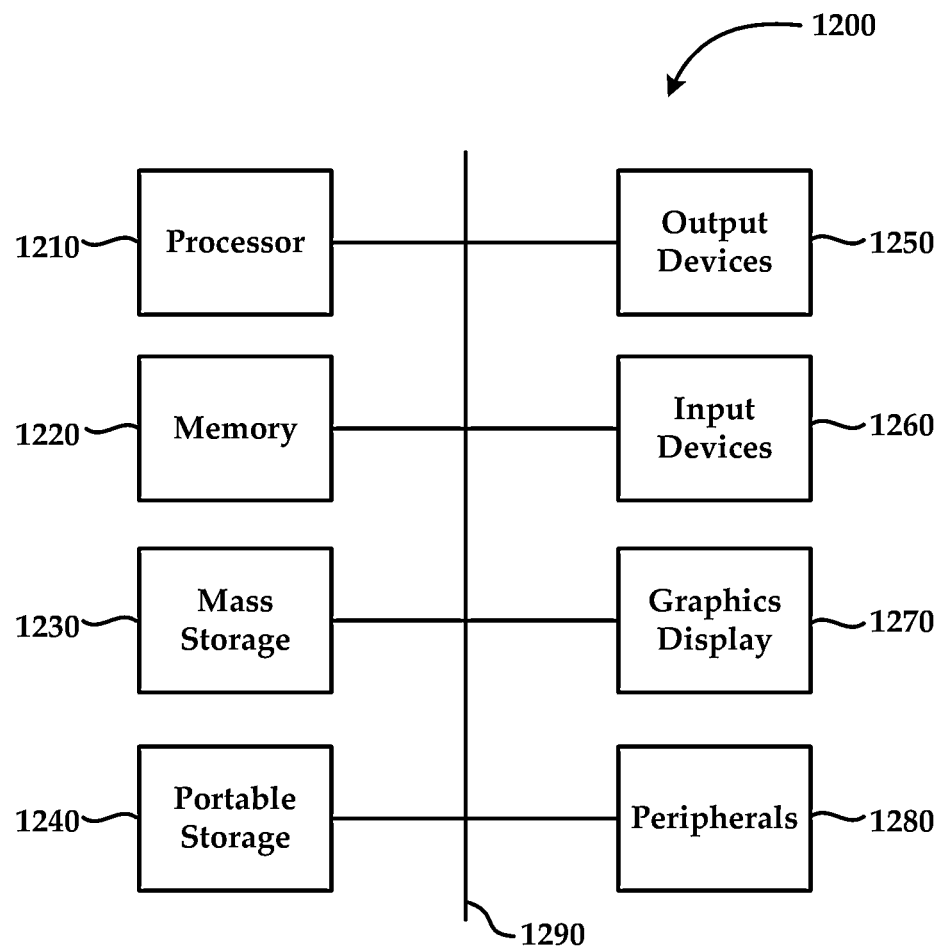
FIG. 12 is a block diagram of an exemplary computing system for implementing embodiments of the present technology.

FIG. 12 illustrates an exemplary computing system 1200 that may be used to implement an embodiment of the present technology. The system 1200 of FIG. 12 may be implemented in the contexts of the likes of computing systems, networks, servers, or combinations thereof. The computing system 1200 of FIG. 12 includes one or more processor (units) 1210 and (main) memory 1220. Main memory 1220 stores, in part, instructions and data for execution by processor 1210. Main memory 1220 may store the executable code when in operation. The system 1200 of FIG. 12 further includes a mass storage device 1230, portable storage medium drive(s) 1240, output devices 1250, (user) input devices 1260, a graphics display 1270, and peripheral device(s) 1280.

The components shown in FIG. 12 are depicted as being connected via a single bus 1290. The components may be connected through one or more data transport means. Processor unit 1210 and main memory 1220 may be connected via a local microprocessor bus, and the mass storage device 1230, peripheral device(s) 1280, portable storage medium drive(s) 1240, and graphics display 1270 may be connected via one or more input/output (I/O) buses.

Mass storage device 1230, which may be implemented with a magnetic disk drive or an optical disk drive, is a non-volatile storage device for storing data and instructions for use by processor unit 1210. Mass storage device 1230 may store the system software for implementing embodiments of the present invention for purposes of loading that software into main memory 1220.

Portable storage medium drive(s) 1240 operates in conjunction with a portable non-volatile storage medium, such as a floppy disk, compact disk, digital video disc, or USB storage device, to input and output data and code to and from the computer system 1200 of FIG. 12. The system software for implementing embodiments of the present invention may be stored on such a portable medium and input to the computer system 1200 via the portable storage medium drive(s) 1240.

Input devices 1260 provide a portion of a user interface. Input devices 1260 may include an alphanumeric keypad, such as a keyboard, for inputting alpha-numeric and other information, or a pointing device, such as a mouse, a trackball, stylus, or cursor direction keys. Additionally, the system 1200 as shown in FIG. 12 includes output devices 1250. Suitable output devices include speakers, printers, network interfaces, and monitors.

Graphics display 1270 may include a liquid crystal display (LCD) or other suitable display device. Graphics display 1270 receives textual and graphical information, and processes the information for output to the display device.

Peripheral device(s) 1280 may include any type of computer support device to add additional functionality to the computer system. Peripheral device(s) 1280 may include a modem or a router.

The components provided in the computer system 1200 of FIG. 12 are those typically found in computer systems that may be suitable for use with embodiments of the present invention and are intended to represent a broad category of such computer components that are well known in the art.

Thus, the computer system 1200 of FIG. 12 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

According to some embodiments, the intermediary node can be configured to process messages that include links to resources such as URLs that are unknown to the intermediary node. That is, the intermediary node does not know whether the resource is associated with malicious content or not. These types of resources are hereinafter referred to as an "unknown resource". These resources include URLs that reference websites or other online resources that have the potential to include malicious content.

Figure 13:
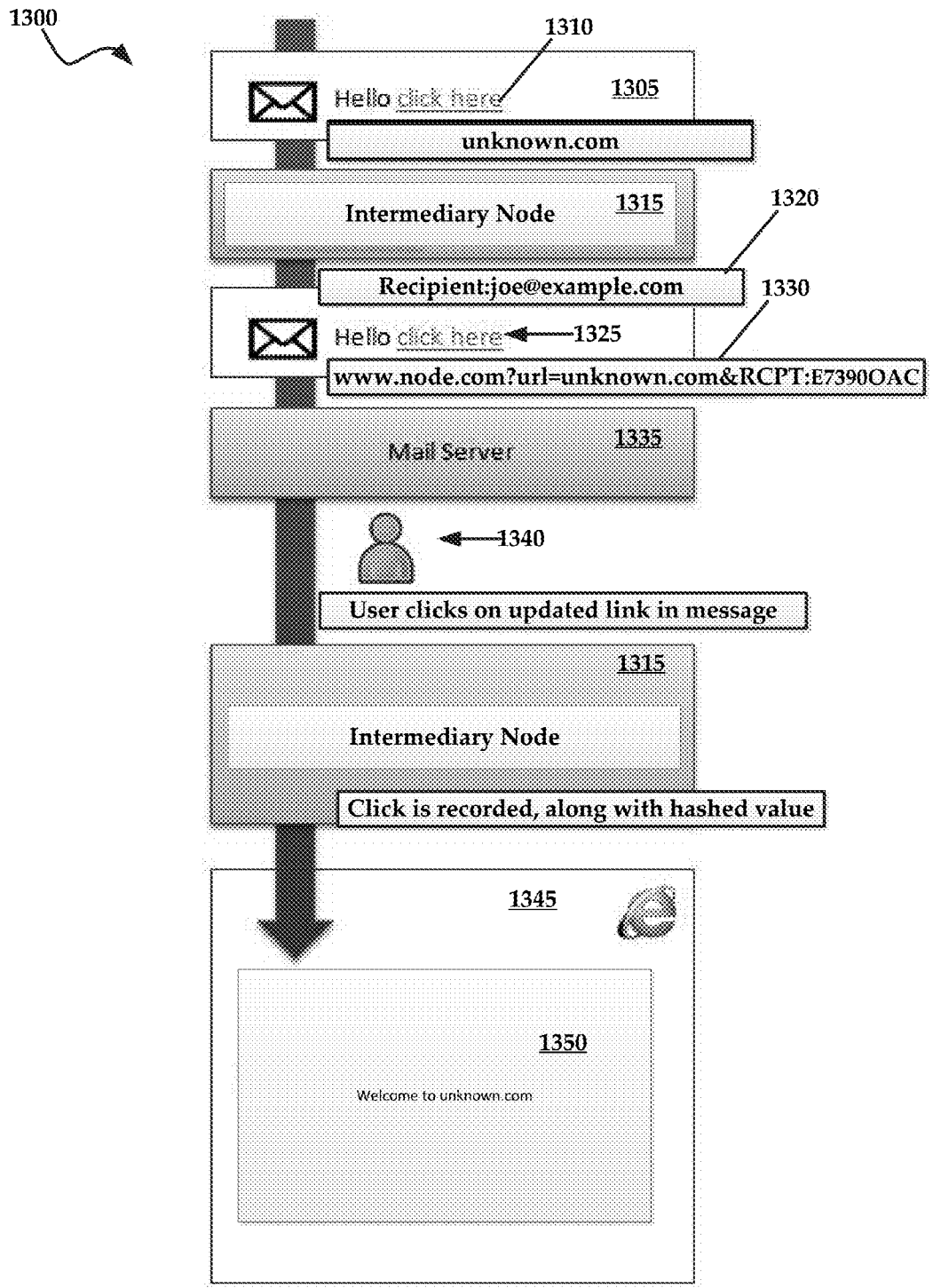
FIG. 13 is a diagrammatical representation of another phishing attack where a message with a link to an unknown resource is detected and processed by various embodiments of the present technology.

Referring now to FIG. 13, another exemplary method 1300 for processing messages is diagrammatically illustrated. In this example method, a message 1305 is transmitted to a recipient. This message includes a link 1310 that is associated with an unknown resource such as "unknown.com", which corresponds to a resource located somewhere on a network. An example of a resource would include a webpage.

The intermediary node 1315 is executed to act as a proxy that processes each message destined for various recipients. The intermediary node 1315 can be placed upstream of various mail servers, such as mail server 1335 that serve messages to these various recipients. The intermediary node 1315 processes each message, looking for links associated with known and unknown resources. If the link is associated with a known clean or malicious resource, the intermediate node uses the methods described in previous sections of this disclosure to block or allow the resources.

When an unknown resource associated with a link 1310 is encountered, the intermediary node 1315 can alter the link 1310 to include a hashed value. The hashed value allows the link and subsequent access to the unknown resource to be tracked. Click operations for one or many recipients can be tracked over time. The hashed value is appended or otherwise associated with the link, such as the URL, creating an updated link.

It will be understood that the same link may be sent to many different recipients using the same or different types of messages. Each of these messages can be processed by the intermediate node to create updated links/messages.

The hashed value can include a hash of a unique identifier for the recipient. For example, the unique identifier can include an email address, a username, a password, or other similar type of unique identifier (or combinations thereof)

that represents the recipient of the messages. The hashed value is appended to, or otherwise associated with the original link to create an updated link.

In one example, if the URL was directed to www.unknown.com, the intermediary node 1315 will recognize the resource as unknown. The intermediary node 1315 will also determine the recipient of the message. If the message is an email, the recipient information is typically determined from the header information of the message. In this example, the recipient is Joe. A unique identifier 1320 for Joe is his email address: joe@example.com. The intermediary node 1315 will hash the email address to create a hash value E73900AC. The intermediary node 1315 can use any suitable hashing algorithm, such as SHA-256.

The intermediary node 1315 may replace the link 1310 in the URL from unknown.com with www.node.com?url=unknown.com&RCPT:joe@example.com: E73900AC to create an updated link URL 1330. The updated link URL 1330 will also include the URL Of the intermediary node (e.g., www.node.com), which ensures that when the recipient clicks on the updated link URL 1330, the request is routed to the intermediary node first. This process allows the intermediary node 1315 to track link click behaviors.

The hashed value E73900AC is a hash of the email address joe@example.com. This hashed value is appended to the URL for the intermediary node and unknown resource. It will be understood that the value is hashing the unique identifying information for the recipient is that it allows link click operations to be tracked at the granularity level of the recipient in some instances (if a mapping between the hashed value and the recipient is maintained). In other embodiments, mappings are not maintained but hashed values can still be evaluated and tracked. If maintained, the mapping may be maintained in the cloud using a cloud-based service, or alternatively, in a private cloud, stored at the customer's premises, or otherwise, depending on the particular security needs of the customer.

In various embodiments, additional information can be included in the hashed value, such as a validation hash. The validation hash aid in the detection of manipulation of the hashed value, e.g., to detect and prevent any manipulation of the parameters. In some embodiments, the validation hash is a hash of all parameters of the hashed value. An example including the additional of the hashed value and the validation hash is as follows: www.node.com?url=unknown.com&rcpt=E73900AC&v=TH444UJT.
For this example, if someone manipulates the request, for example: www.node.com?url=unknown.com&rcpt=E73800AC&v=TH444UJT, various embodiments detect that the request has been tampered with, such manipulation.

In some embodiments, additional information can be included in the hashed value, such as a security value. This security value aids in protecting the identity of the recipient and adds additional identifying information for the recipient. For example, a security value could include a phone number or employee identification number. The security value can be hashed with the unique recipient identifier to create a single value. Alternatively, the security value can be hashed separately from the unique recipient identifier to create two hashes. The two hashes can be included in the updated link. For example, if the recipient includes an employee number of 43218838255, the updated link URL 1330 would include www.node.com?url=unknown.com&RCPT:joe@example.com: E73900AC-TH444UJT, where TH444UJT is a hashed value for 43218838255.

The intermediary node 1315 forwards an updated message 1325 (that includes the updated link information) to the intended recipient 1340. This process can occur for many recipients that are provided with a link to the unknown resource in any type of message.

When the recipient 1340 clicks on the updated link, a request for the updated link URL 1330 is executed by a browser client 1345 of the recipient. The content 1350 of the resource is displayed in the browser client 1345.

Again, when the link is clicked, a request for the unknown resource is provided to the intermediary node 1315 prior to the browser client 1345 accessing the unknown resource. This process allows the request (which includes the hashed value) to be tracked.

Figure 14:
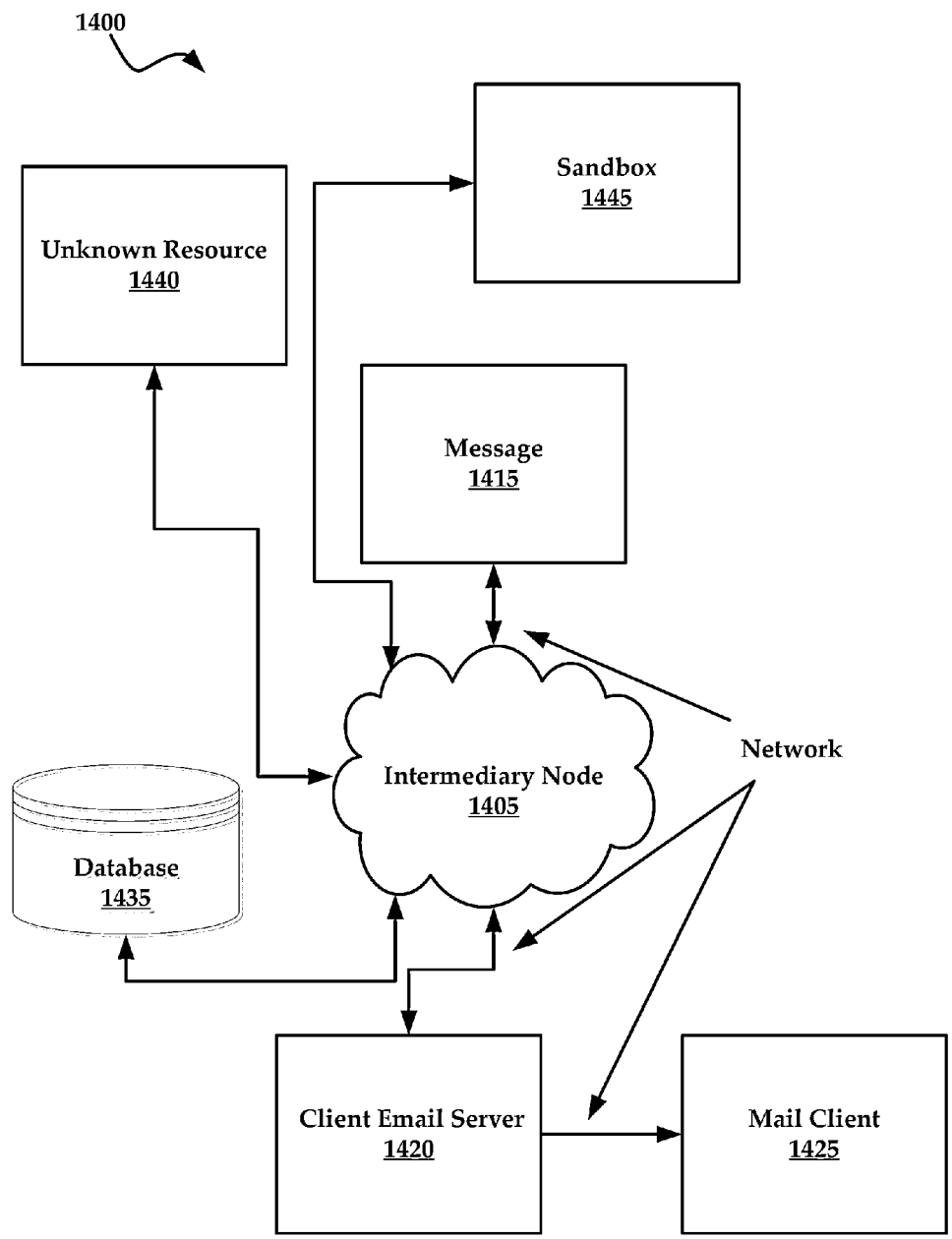
FIG. 14 is another exemplary architecture for practicing aspects of the present technology.

FIG. 14 illustrates an example computing architecture 1400 that can be used to practice aspect of the present technology. The architecture 1400 comprises an intermediary node 1405, a client email server 1420, a mail client 1425, a database 1435, an unknown resource 1440, and a sandbox 1445.

The intermediary node 1405 receives messages, such as message 1415 from a sender (not shown). The sender can include an SMTP server such as the SMTP server illustrated in FIG. 1.

The message, as mentioned above, comprises at least a link that includes a reference to the unknown resource 1440. The unknown resource 1440 can include, for example, a website or a webpage. The intermediary node 1405 processes the message 1415 to extract the reference, such as a URL link to the unknown resource 1440.

The intermediary node 1405 will examine the message 1415 for a unique identifier for the recipient (mail client 1425) of the message. For example, the intermediary node 1405 can obtain the email address of the recipient. The intermediary node 1405 hashes the email address to create a hash value.

In some embodiments, the intermediary node 1405 stores a mapping of the hash value and the email address in the database 1435. In the example provided in FIG. 13, the unknown resource 1440 was defined by a URL www.unknown.com. The email address of the recipient was joe@example.com. The hash value of joe@example.com was E73900AC.

The intermediary node 1405 will map E73900AC to joe@example.com, storing the same in the database 1435. The mapped information can be stored as a record with other information such as additional identifying information for the recipient.

According to some embodiments, the intermediary node 1405 will place the unknown resource 1440 into the sandbox 1445 for a period of time, referred to as a testing period. Placing the unknown resource 1440 into the sandbox 1445 refers to a process whereby the unknown resource 1440 can be tested in a secure environment. For example, testers can watch how the unknown resource 1440 operates, whether malware is uploaded by the unknown resource 1440 or whether other malicious effects would be experienced by a user encountering the unknown resource 1440.

The testing period can include any suitable time period which is required in order to determine if the unknown resource 1440 is clean or malicious.

During this time period, recipients of messages that request the unknown resource 1440 are allowed to navigate to the unknown resource 1440. That is, once the intermediary node 1405 has updated the URL link of message. The intermediary node 1405 forwards the message 1415 to the recipient (mail client 1425).

When the recipient clicks on the updated link the in message 1415, a browser client used by the recipient is executed and transmits to the intermediary node 1405 a request for the unknown resource 1440.

It is noteworthy that the intermediary node 1405 potentially receives many messages destined for many different recipients during the testing period for the unknown resource 1440. Each of these messages includes a link to the unknown resource 1440.

On a related note, when the unknown resource 1440 is determined to be either safe or malicious, subsequent messages that include links for the unknown resource 1440 are processed according to the embodiments described above. For example, the unknown resource 1440 can be safelisted or blocklisted if malicious.

Each message is updated by the intermediary node 1405 to include the updated URL information that includes a hash value that is unique to the recipient. As one or more recipients click the updated link in their message, the intermediary node 1405 extracts the hash values from the requests for the unknown resource 1440.

The intermediary node 1405 can track the click operations and store information indicative of the clicks in the database 1435. For example, the intermediary node 1405 may store in a recipient record an indication that the recipient clicked on the updated link.

Various metrics regarding clicks for the unknown resource 1440 can be determined by evaluating the hash values. For example, the intermediary node 1405 can determine an aggregate number of clicks over a given period of time. The intermediary node 1405 can infer from these clicks whether the unknown resource 1440 is malicious. For example, an exponential increase in messages that include a link for the unknown resource 1440, seen after an initial click through by a handful of recipients indicates that a malicious attack has occurred. This could be inferred because malicious software, such as a trojan horse is causing recipients to email a link to the unknown resource 1440 to every contact of the recipients. In some embodiments, such metrics can be compiled for display to visually provide insight into the process, e.g., show that particular groups, individuals, business types, etc.

Thus, it will be understood that the tracking of click operations and/or subsequent message received by the intermediary node 1405 can be used in addition to the testing procedures occurring in the sandbox 1445. That is, the message and click tracking methods described herein can assist the intermediary node 1405 in determining if the unknown resource is safe or malicious.

The hash values can be grouped in the database 1435 according to a common characteristic shared between the recipients. For example, if the recipients are served by the same email server, belong to the same company, or are located in the same city. These are merely examples and other common characteristics can be used. Other examples include a company name, a group identifier, a geographical region (e.g., North America, Europe, etc.), a business type (e.g., banking, etc.), and combinations thereof.

The common characteristic can be located from the recipient records maintained in the database 1435.

In one embodiment, the intermediary node 1405 is configured to receive a request for the unknown resource, where the request comprises the updated link. The request can be generated by a browser client of the recipient.

Next, the intermediary node 1405 compares the hashed identifier of the updated link to the database 1435. In some embodiments, the intermediary node 1405 can receive a request for information indicative of the request for the updated link. For example, a company may want to know how many (or which) of their employees clicked the link and navigated to the unknown resource 1440.

Thus, the intermediary node 1405 can return the unique identifier(s) of the recipient(s), for example, in a report to the employer. In some embodiments, the company is not privy to the mapping between the click actions and the employees (the mapping might not even be maintained in some embodiments). The report would only include aggregate numbers and not direct references to the hashed identifiers or the employee identifiers associated with the click actions.

In some embodiments, only authorized individuals are given access to the click tracking and resource access information, such as an information technology administrator of a company.

Figure 15:
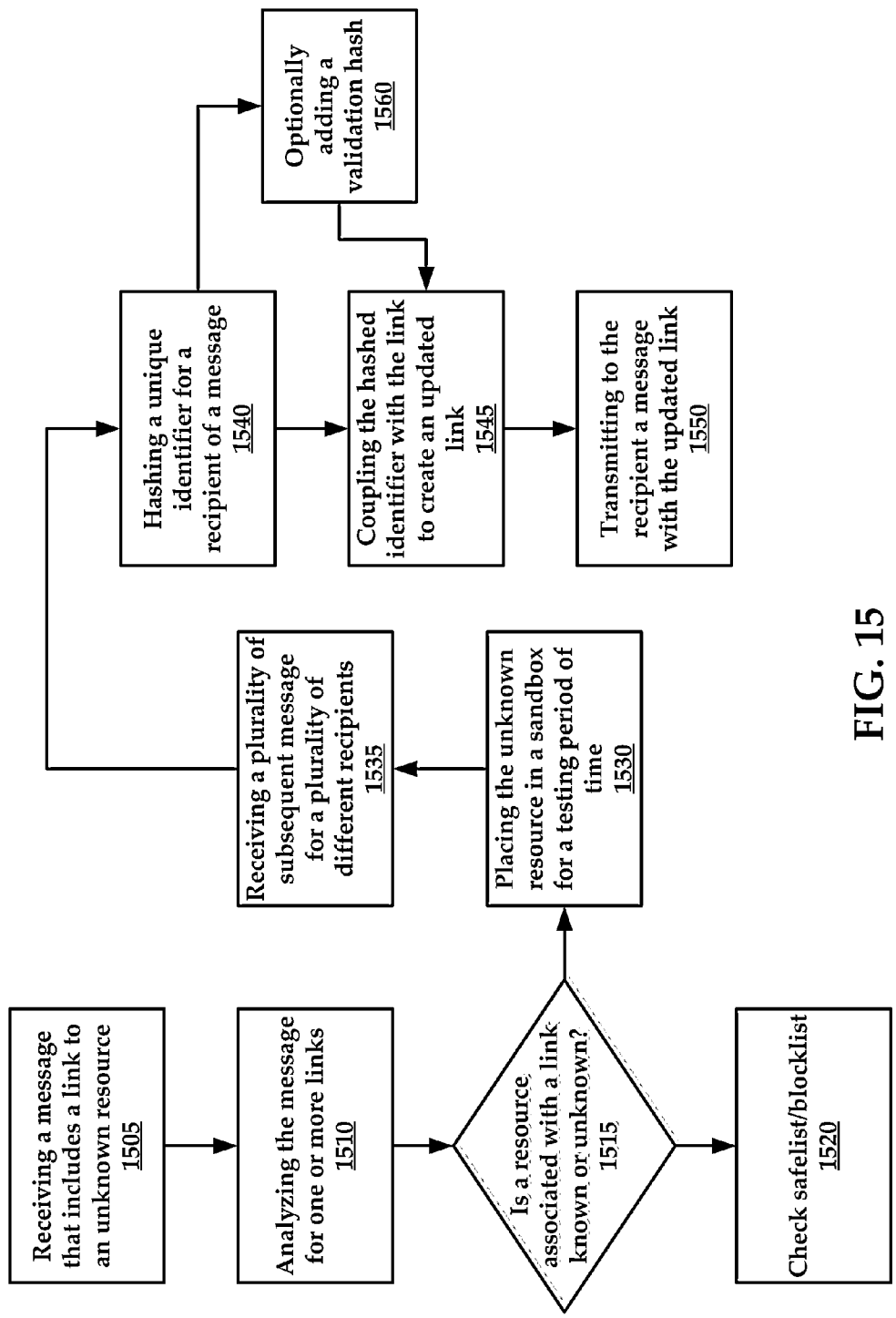
FIG. 15 is a flow chart of another exemplary method for processing messages in accordance with the present technology.

Referring now to FIG. 15, an exemplary method of message processing is illustrated. The method begins with the intermediate node receiving, at step 1505, a message that includes a link to an unknown resource. The message, such as an email message, is addressed to a particular recipient.

When the email is received, method includes analyzing, at step 1510, the message for one or more links. If the message comprises one or more links, the method comprises determining, at step 1515, if a resource associated with a link is known or unknown. If the resource is known, the method comprises, at step 1520, checking safelists or blocklists and proceeding accordingly. For example, if the resource is on a safelist, the recipient is directed to the resource. If the resource is malicious, the recipient can be redirected to a safe URL.

If the resource is unknown, the method comprises placing, at step 1530, the unknown resource in a sandbox for a testing period of time.

It will be understood that placing the unknown resource in the sandbox conceptually includes a testing process whereby the unknown resource, such as a webpage, is tested to determine if the unknown resource is malicious.

During the testing period of time, the method comprises the intermediate node receiving, at step 1535, a plurality of subsequent messages (e.g., emails) for a plurality of different recipients. That is, numerous other messages that each includes a link to the unknown resource may be transmitted to various recipients.

In addition to the first message above that included the link to the unknown resource, the intermediate node will receive these subsequent email messages and process them in the following process.

For each message that is received by the intermediate node that has a link to the unknown resource, the method includes the intermediate node hashing, at step 1540, a unique identifier for a recipient of a message. The method also includes the intermediate node coupling, at step 1545, the hashed identifier with the link to create an updated link, as well as transmitting, at step 1550, to the recipient a message with the updated link.

As mentioned above, the hashing and link/message updating process will continue for message received during the testing period of time.

After the testing period, the unknown resource is determined to be either safe or malicious. If the unknown resource is safe, it can be placed in a safelist, whereas if the unknown resource malicious safe, it can be placed in a blocklist.

In some embodiments, the method includes optionally including, at step 1560, a validation hash, along with the hashed value in the updated link. As mentioned above, the addition of the validation hash in some embodiments is to aid in the detection of manipulation of the hashed value, e.g., to detect and prevent any manipulation of the parameters.

In some embodiments, the hashing may include the addition of a different "salt" for each customer, comprising additional encoding for security against a potential attacker.

The methods described herein can include fewer or more steps than those illustrated in the figures.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A method for processing messages using an intermediary node having a processor and a memory for storing executable instructions, the processor executing the instructions to perform the method, comprising:
   detecting, via the intermediary node, a link included in a message, the link being associated with an unknown resource;
   hashing a unique identifier for a recipient of the message;
   coupling the hashed identifier with the link, creating an updated link and updated message; and
   forwarding the updated message to the recipient.

2. The method according to claim 1, further comprising placing the unknown resource in a sandbox for testing; and blocking access to the unknown resource if the unknown resource is determined to be malicious.

3. The method according to claim 2, wherein if the unknown resource is determined to be malicious, subsequent messages that include the link will, before the message is forwarded to the recipient, be modified with an alternate link to a trusted resource.

4. The method according to claim 1, wherein the unique identifier is an email address of the recipient that is determined from the message.

5. The method according to claim 4, wherein the hashed identifier is appended to the end of the link to create the updated link; wherein clicking on the updated link causes a request for the unknown resource to be received by the intermediary node.

6. The method according to claim 5, further comprising mapping the hashed identifier to the unique identifier of the recipient; and storing the mapping in a database.

7. The method according to claim 6, further comprising detecting if the recipient has clicked on the updated link by:
   receiving a request for the unknown resource, the request comprising the updated link;
   comparing the hashed identifier of the updated link to the database; and
   returning the unique identifier of the recipient, the unique identifier identifying the recipient.

8. The method according to claim 7, further comprising quarantining the message if the link is associated with a malicious or potentially malicious resource or content of the email is malicious or potentially malicious.

9. A method for processing messages using an intermediary node having a processor and a memory for storing executable instructions, the processor executing the instructions to perform the method, comprising:
   receiving a message that includes a link to an unknown resource;
   placing the unknown resource in a sandbox for a testing period of time so as to determine if the unknown resource is malicious;
   for each message of a plurality of subsequent messages for a plurality of different recipients, the plurality of subsequent messages comprising the link, the plurality of subsequent messages being received during the testing period of time:
   hashing a unique identifier for a recipient of each message;
      coupling the hashed identifier with the link to create an updated link; and
      transmitting to the recipient the message with the updated link.

10. The method according to claim 9, further comprising blocking access to the unknown resource for the plurality of different recipients if the unknown resource is determined to be malicious during the testing period of time.

11. The method according to claim 10, further comprising tracking which of the plurality of different recipients clicked the updated link.

12. The method according to claim 11, further comprising, for the plurality of different recipients, mapping a hashed identifier to the unique identifier of the recipient.

13. The method according to claim 12, further comprising:
   receiving a plurality of requests for the unknown resource during the testing period of time, each of the plurality of requests comprising a hashed identifier included in an updated link;
   for each of the plurality of requests, querying a database for a mapping of each hashed identifier so as to determine a unique identifier for each hashed identifier; and
   identifying the recipient associated with each of the plurality of requests using the unique identifiers.

14. The method according to claim 10, wherein the link comprises a URL for the unknown resource and the updated link comprises a URL referring to the intermediary node, the URL for the unknown resource, and the hashed identifier.

15. A method, comprising:
   detecting a link included in messages sent to a plurality of recipients, the link being associated with an unknown resource;
   for the plurality of recipients:
      coupling a hashed value with the link, the hashed value being a hashing of a unique identifier for a recipient of the message in combination with a validation hash, the validation hash being for detection of manipulation of the hashed value;
      creating an updated link and updated message; and
      forwarding the updated message to the recipient.

16. The method according to claim 15, further comprising placing the unknown resource in a sandbox for testing; and blocking access to the unknown resource if the unknown resource is determined to be malicious.

17. The method according to claim 16, further comprising tracking a number of recipients that clicks on the updated link.

18. The method according to claim 17, further comprising ascertaining patterns of malicious activity by evaluating clicks for updated links from a plurality of recipients.

19. The method according to claim 18, further comprising grouping recipients that clicked on an updated link based upon a common characteristic between the recipients.

20. The method according to claim 19, wherein the common characteristic comprises a company, a group, a geographical region, a business type, and combinations thereof.

* * * * *